United States Patent [19]

Greco, Jr.

[11] Patent Number: 4,873,611
[45] Date of Patent: Oct. 10, 1989

[54] ELECTRICALLY INSULATING FLUIDS

[75] Inventor: William J. Greco, Jr., Forked River, N.J.

[73] Assignee: Sybron Chemicals, Inc., Birmingham, N.J.

[21] Appl. No.: 347,061

[22] Filed: May 4, 1989

Related U.S. Application Data

[63] Continuation-in-part of Ser. No. 213,237, Jun. 29, 1988, abandoned.

[51] Int. Cl.⁴ ............................................. H01G 4/22
[52] U.S. Cl. .................................................... 361/315
[58] Field of Search ................. 361/314, 315, 504–507

[56] References Cited

U.S. PATENT DOCUMENTS

| | | | |
|---|---|---|---|
| 4,355,346 | 10/1982 | Gauger et al. | 361/315 X |
| 4,642,730 | 2/1987 | Sato et al. | 361/315 |
| 4,772,428 | 9/1988 | Kron et al. | 361/315 X |

Primary Examiner—Donald A. Griffin
Attorney, Agent, or Firm—Marjama & Pincelli

[57] ABSTRACT

An electrical capacitor which contains a dielectric fluid, said fluid consisting essentially of ditolylmethane.

4 Claims, No Drawings

ELECTRICALLY INSULATING FLUIDS

RELATED APPLICATIONS

This application is a continuation-in-part application of U.S. Ser. No. 07/213,237, filed June 29, 1988, entitled "Electrically Insulating Fluids".

BACKGROUND OF THE INVENTION

The present invention relates to electrical insulating fluids, and more specifically, to insulating fluids having particularly good low temperature properties for use in capacitors.

Many dielectric insulator fluids which have desirable electrical properties for use in capacitors have the disadvantage of being essentially non-biodegradeable, and therefore, are the cause of potential pollution problems to the environment. Other fluids may perform satisfactorily from an electrical standpoint, but are undesirable with respect to other properties, such as having undesirable relatively high pour point, or having a relatively low flash or fire point.

There, therefore, is a continuing need for electrical insulating fluids which exhibit a combination of electrical, physical and biodegradeable properties which make them optimum candidates for use as electrical insulating fluids in devices such as capacitors.

SUMMARY OF THE INVENTION

It has been discovered that ditolylmethane (DTM), which has the following structural formula, is highly suitable for use as any electrical insulating fluid either alone or in combination with other fluids in any suitable ratio. Mixtures of 50–50, or from 20–80 to 80–20 by volume are suitable. In addition, more than one other fluid may be mixed with the DTM.

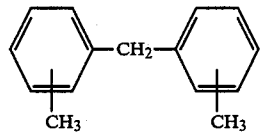

It is known that DTM is suitable for use in applications other than electrical dielectric fluids, and has been used in the manufacture of carbonless copy paper solvents, such as set forth in U.S. Pat. No. 3,836,383. Prior art teachings of this type, however, do not appreciate the advantage and desirability of such materials for use as dielectric fluids in devices such as capacitors. In fact, it is surprising that DTM performs so well in capacitors because prior art actually teaches against its use. U.S. Pat. No. 4,642,730 describes the diarylalkane fluid family of which DTM is a member, as not always satisfactory in electrical characteristics, and that conventional diarylalkane electrical fluids are mixtures of by-product oils from other industrial preparations. In addition, U.S. Pat. No. 4,054,937 teaches that dimethyl substituted diphenylmethane (DTM) is not acceptable due to its high melting point and high vapor pressure.

It has been discovered that ditolylmethane, prepared inexpensively and easily in ultrapure form (99+wt.%) via the Baeyer condensation reaction described below, is in fact a superior electrical insulating oil. It is therefore surprising then, in view of prior art teachings, that DTM prepared as described herein, performs so well in capacitors.

DETAILED DESCRIPTION OF THE INVENTION

The use of DTM in the present invention as an electrically insulating fluid can be prepared easily and inexpensively by the well known Baeyer condensation of toluene with formaldehyde in the presence of acidic catalysts by the following reaction:

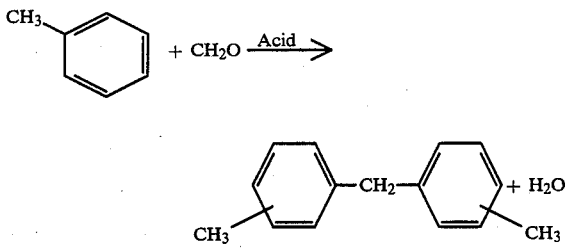

A patent disclosing this synthesis is exemplified by U.S. Pat. No. 2,848,509. This patent, however, does not appreciate the use of these products as electrical insulating fluids. Indeed, diarylalkanes have been described as unsatisfactory capacitor fluids in the prior art when other conventional methods of preparation are used. It was surprisingly found in testing DTM, that it was not only an acceptable, but a highly suited capacitor fluid. The pour point was unexpectedly low for a symmetrical molecule, making it an exceptionally suitable material for capacitor use.

A typical use for the material of the present invention is in electrical capacitors of the type illustrated by U.S. Pat. No. 4,355,346, which is incorporated herein by reference.

Typical capacitors include a container which is hermetically sealed holding one or more windings containing a conducting, foil. These foils alternate with layers of an insulating material. The foil may comprise any suitable electrical conductive material, such as a metallic material, i.e., aluminum, copper, or the like. The layers may be in the form of flat sheets. The dielectric layer may be composed any suitable material such as paper, or a polymeric film, such as polypropylene, polyethlene, polyester, polycarbonate, or the like. In use, the dielectric layer is impregnated with DTM of the present invention. Electrode terminations may be provided in accordance with conventional practice known in the art for capacitors, such as, for example, as set forth in U.S. Pat. No. 4,355,346.

Typical properties for the material of the present invention, as compared to other typical prior art dielectric fluids, are set forth below in the Table. The fluid of the present invention which is illustrated in the Table has a purity of 99.9 wt.%. The prior art dielectric fluids comprise diorthoxylylethane (DOXE), phenylorthoxylylethane (POXE), and isopropylbiphenyl (IPBP). These fluids may also be mixed with the fluids of the present invention.

TABLE

|  | SPECIFICATIONS FOR PRIOR ART FLUIDS | | | PRESENT INVENTION TYPICAL ANALYSIS |
| --- | --- | --- | --- | --- |
|  | DOXE | POXE | IPBP | DTM |
| DC Leakage (Max) ua @ 15 KV | .3 | .3 | .3 | .03 |
| Dissipation Factor (Max) | .0015 | .001 | .0015 | .0001 |
| Dielectric Constant (±.05) | 2.55 | 2.63 | 2.55 | 2.573 |
| Resistivity* (Min) | $5 \times 10^{13}$ | $5 \times 10^{13}$ | $5 \times 10^{13}$ | $5 \times 10^{13}$ |
| HV Breakdown (Min)KV(500 vps) | 45 | 60 | 45 | 75 |
| Fire Point (Min) °C. | 150 | 155 | 150 | 160 |
| Flash Point (Min) °C. | 145 | 145 | 150 | 150 |
| Pour Point (Max) °C. | −45 | −50 | −45 | −64 |

*ohm-cm; 500 V, 1 min.

As can be seen from the electrical properties set forth in the Table above, the fluid of the present invention exhibits, in general, equal or better properties when compared to typical materials of the prior art, and is superior with respect to low temperature pour point, flash point and fire point.

Although particular embodiments of the present invention have been disclosed herein for purposes of explanation, further modification or variations thereof will be apparent to those skilled in the art to which this invention pertains.

What is claimed is:

1. An electrical capacitor comprising a sealed casing having alternate layers of an electrically conductive material and a dielectric material disposed within the casing, and dielectric fluid impregnated into said dielectric material, said dielectric fluid consisting essentially of ditolylmethane.

2. The device of claim 1 in which the dielectric fluid consists essentially of a mixture of ditolylmethane and at least one other dielectric fluid.

3. An electrical capacitor comprising a sealed casing having alternate layers of an electrically conductive material and a dielectric material disposed within the casing, and dielectric fluid impregnated into said dielectric material, said dielectric fluid consisting of ditolylmethane, and at least one fluid selected from the group consisting of mixed diarylmethanes, diorthoxylylethane, phenylorthoxylethane, isopropylbiphenyl, and mixtures thereof.

4. An electrical capacitor comprising a sealed casing having alternate layers of an electrically conductive material and a dielectric material disposed within the casing, and dielectric fluid impregnated into said dielectric material, said dielectric fluid consisting essentially of ditolylmethane with said ditolylmethane being made by the Baeyer condensation reaction and exhibiting a purity of over 99 wt.%.

* * * * *